US010438011B2

(12) United States Patent
Ueda

(10) Patent No.: US 10,438,011 B2
(45) Date of Patent: Oct. 8, 2019

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Yoshihiro Ueda, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 238 days.

(21) Appl. No.: 15/237,166

(22) Filed: Aug. 15, 2016

(65) Prior Publication Data

US 2017/0262641 A1   Sep. 14, 2017

(30) Foreign Application Priority Data

Mar. 9, 2016 (JP) .................................. 2016-045243

(51) Int. Cl.
| | |
|---|---|
| G06F 21/62 | (2013.01) |
| G06F 11/34 | (2006.01) |
| G06F 11/30 | (2006.01) |
| H04L 12/58 | (2006.01) |

(52) U.S. Cl.
CPC ...... *G06F 21/6209* (2013.01); *G06F 11/3024* (2013.01); *G06F 11/34* (2013.01); *H04L 51/22* (2013.01)

(58) Field of Classification Search
USPC .......... 726/26, 2, 21, 36; 713/150, 163, 181; 380/255, 264, 276
See application file for complete search history.

(56) References Cited

U.S. PATENT DOCUMENTS

| | | | | |
|---|---|---|---|---|
| 2007/0220061 | A1* | 9/2007 | Tirosh | G06F 21/556 |
| 2011/0202574 | A1* | 8/2011 | Iwase | G06F 16/93 |
| | | | | 707/802 |
| 2015/0169743 | A1* | 6/2015 | Moriwaki | G06Q 30/02 |
| | | | | 707/739 |
| 2016/0217276 | A1* | 7/2016 | Choi | G06F 21/10 |

FOREIGN PATENT DOCUMENTS

| | | |
|---|---|---|
| JP | 2006-079216 A | 3/2006 |
| JP | 2007-048053 A | 2/2007 |
| JP | 2008-117287 A | 5/2008 |
| JP | 2010-009239 A | 1/2010 |

* cited by examiner

*Primary Examiner* — Sharif E Ullah
(74) *Attorney, Agent, or Firm* — Oliff PLC

(57) ABSTRACT

According to an aspect of the invention, an information processing apparatus includes a monitoring unit and a control unit. The monitoring unit monitors movement of each document being correlated with a score indicating how much the document includes pieces of personal information. The control unit controls the movement of the document monitored by the monitoring unit when a relationship among an importance degree of personal information of a movement source, an importance degree of personal information of a movement destination, and the score of the document which is a target to be moved corresponds to a predetermined relationship in a case where the document having the score larger than a predetermined threshold value or greater than or equal to the predetermined threshold value is set to the target to be moved.

8 Claims, 12 Drawing Sheets

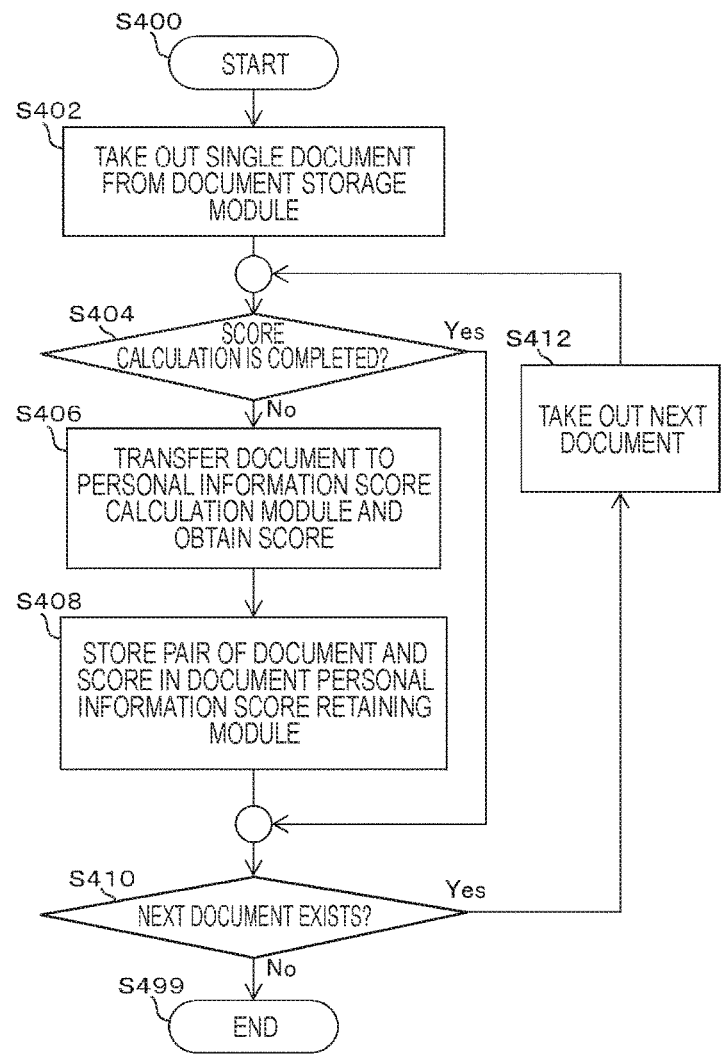

FIG. 6

| | CONTENTS |
|---|---|
| 610 — DIRECTORY | POINTER TO DIRECTORY |
| 620 — NAME | DIRECTORY NAME |
| 630 — PERSONAL INFORMATION GROUP | NAME INDICATING WHICH PERSONAL INFORMATION TO BE HANDLED IS GIVEN (USER FOR X SERVICE, MAIL MAGAZINE MEMBERS OR THE LIKE) |
| 640 — PERSONAL INFORMATION LEVEL | IMPORTANCE DEGREE OF PERSONAL INFORMATION |
| 650 — MY-NUMBER LEVEL | WHETHER MY-NUMBER IS INCLUDED (1) OR NOT (0) |

FIG. 7

| | CONTENTS |
|---|---|
| 710 — USER ID | USER ID |
| 720 — PERSONAL INFORMATION GROUP | NAME INDICATING WHICH PERSONAL INFORMATION TO BE HANDLED IS GIVEN (USER FOR X SERVICE, MAIL MAGAZINE MEMBERS OR THE LIKE) |
| 730 — PERSONAL INFORMATION LEVEL | IMPORTANCE DEGREE OF PERSONAL INFORMATION THE USER CAN HANDLE |
| 740 — MY-NUMBER LEVEL | WHETHER MY-NUMBER IS CAPABLE OF BEING HANDLED (1) OR NOT (0) |

FIG. 8

| PERSONAL INFORMATION LEVEL | PERSONAL INFORMATION SCORE | CONTENTS |
|---|---|---|
| 3 | 100~ | PLURAL CREDIT CARD NUMBERS, ACCOUNT NUMBERS, PIECES OF RELIGION OR HEALTH INFORMATION OR THE LIKE ARE INCLUDED |
| 2 | 10~100 | ANY ONE OF CREDIT CARD NUMBER, ACCOUNT NUMBER, PIECE OF RELIGION OR HEALTH INFORMATION OR THE LIKE IS INCLUDED |
| 1 | 0~10 | MAIL ADDRESS, NAME AND ADDRESS OR THE LIKE IS INCLUDED |

FIG. 9

| MY-NUMBER LEVEL | MY-NUMBER SCORE | CONTENTS |
|---|---|---|
| 1 | 10~ | POSSIBILITY OF INCLUDING MY-NUMBER IS 10% OR MORE |
| 0 | 0~10 | POSSIBILITY OF INCLUDING MY-NUMBER IS LESS THAN 10% |

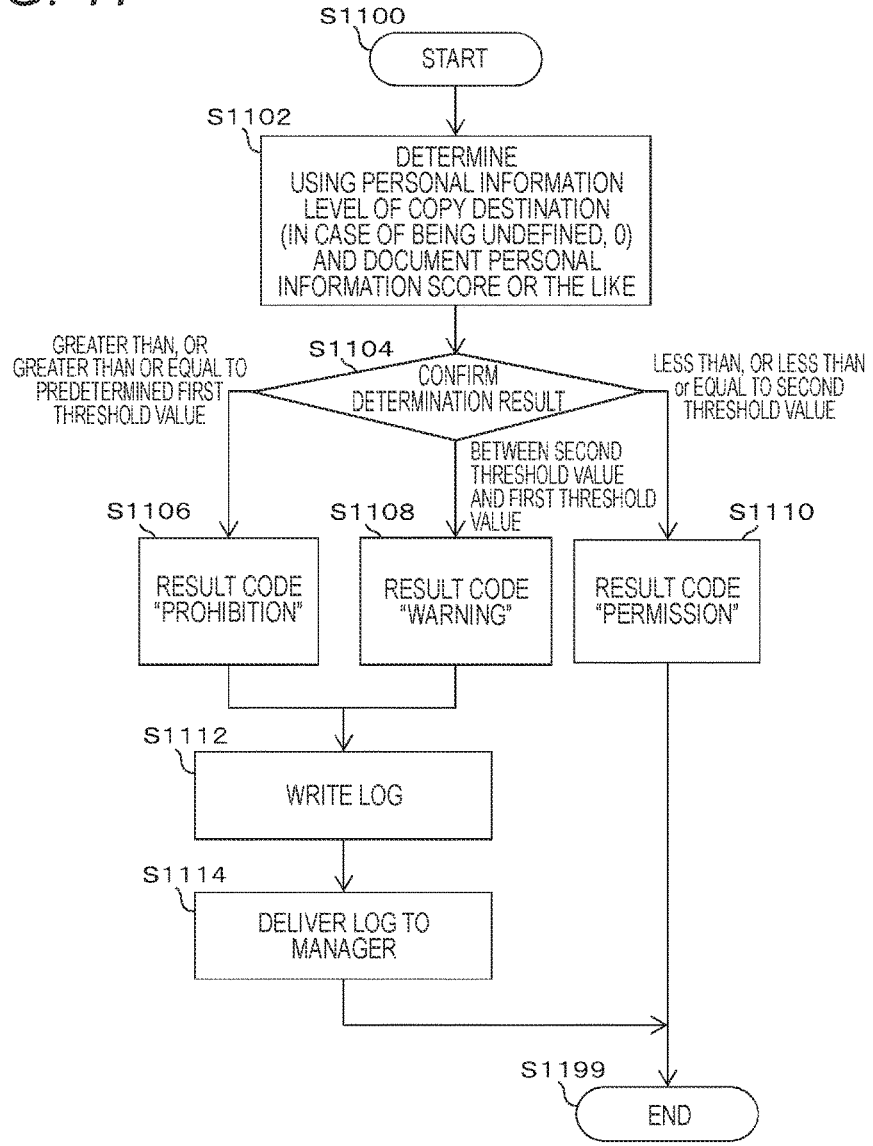

FIG. 13

| LOG ID | DATE AND TIME | DOCUMENT NAME | RESULT CODE | COPY SOURCE | COPY DESTINATION | USER ID |
|---|---|---|---|---|---|---|
| | | | | | | |

| COPY SOURCE MY-NUMBER LEVEL | COPY DESTINATION MY-NUMBER LEVEL | MY-NUMBER SCORE | RESPONSE |
|---|---|---|---|
| 1 | 0 | 10 ~ | PROHIBITION |
| 1 | 0 | 0~10 | WARNING |

1410　1420　1430　1440

1400

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-045243 filed on Mar. 9, 2016.

BACKGROUND

Technical Field

The present invention relates to an information processing apparatus and a non-transitory computer readable medium.

SUMMARY

An aspect of the invention provides an information processing apparatus including: a monitoring unit that monitors movement of each document being correlated with a score indicating how much the document includes pieces of personal information; and a control unit that controls the movement of the document monitored by the monitoring unit when a relationship among an importance degree of personal information of a movement source, an importance degree of personal information of a movement destination, and the score of the document which is a target to be moved corresponds to a predetermined relationship in a case where the document having the score larger than a predetermined threshold value or greater than or equal to the predetermined threshold value is set to the target to be moved.

Another aspect of the invention provides a non-transitory computer readable medium storing a program causing a computer to function as: a monitoring unit that monitors movement of each document being correlated a score indicating how much the document includes pieces of personal information; and a control unit, wherein in a case where a document having the score equal to or larger than a predetermined threshold value is set to a target to be moved, when a relationship among an importance degree of personal information of a movement source, an importance degree of personal information of a movement destination, and the score of the document which is the target to be moved corresponds to a predetermined relationship, the control unit controls the movement.

BRIEF DESCRIPTION OF DRAWINGS

Exemplary embodiments of the present invention will be described in detail based on the following figures, wherein:

FIG. 4 is a flowchart illustrating an example of a process performed by the first exemplary embodiment;

FIG. 5 is an explanatory diagram illustrating an example of a data structure of a document and personal information score pair table;

FIG. 6 is an explanatory diagram illustrating an example of a data structure of a personal information retaining level definition table;

FIG. 7 is an explanatory diagram illustrating an example of a data structure of a user definition table;

FIG. 8 is an explanatory diagram illustrating an example of a data structure of a personal information level table;

FIG. 9 is an explanatory diagram illustrating an example of a data structure of a My-Number level table;

FIG. 11 is a flowchart illustrating an example of still another process performed by the first exemplary embodiment;

FIG. 12 is an explanatory diagram illustrating an example of a data structure of a determination condition table;

FIG. 13 is an explanatory diagram illustrating an example of a data structure of a log table;

FIG. 14 is an explanatory diagram illustrating an example of a data structure of another determination condition table;

DETAILED DESCRIPTION

Hereinafter, examples of exemplary embodiments in implementing the present invention will be described based on the drawings.

First Exemplary Embodiment

Figure 1:
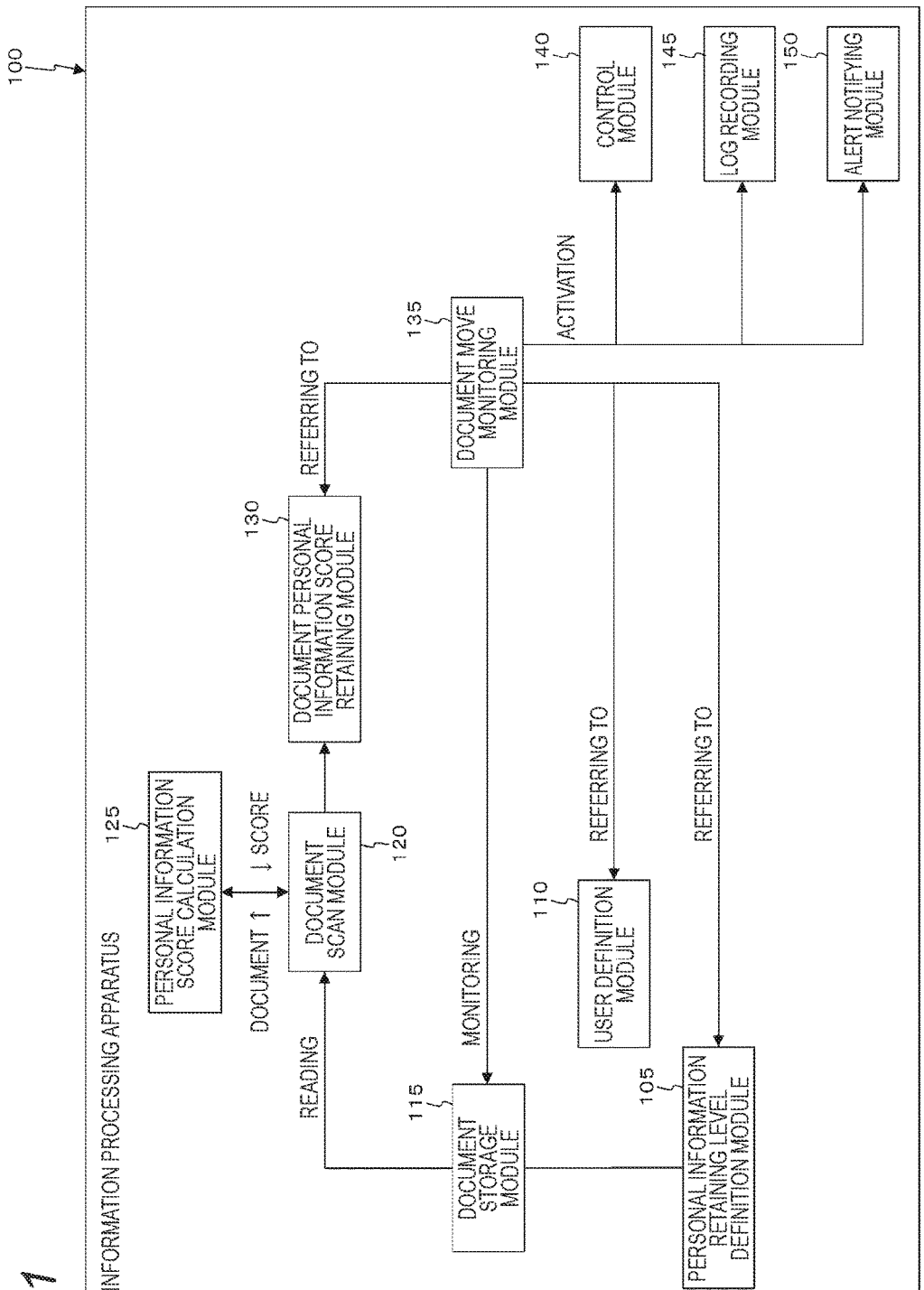
FIG. 1 is a configuration diagram conceptually illustrating modules in a configuration example of a first exemplary embodiment.

FIG. 1 is a configuration diagram conceptually illustrating modules in a configuration example of a first exemplary embodiment.

A module generally refers to logically divisible pieces of software (a computer program) or hardware or the like. Accordingly, the module in the exemplary embodiment refers not only to a module in a computer program but also to a module in a hardware configuration. Therefore, in the exemplary embodiment, a computer program that functions as the modules (a program for causing a computer to execute respective procedures, a program for causing a computer to function as respective units, a program for causing a computer to implement respective functions), a system, and a method are also described. For the convenience of explanation, the expressions of "stores", "is stored", and other expressions equivalent to the expressions are used. However, in a case where an exemplary embodiment is a computer program, these expressions mean that something is caused to be stored in a storage device or control is performed such that something is stored in the storage device.

The module may have a one-to-one correspondence with a function. However, in mounting the modules, a single module may be configured by a single program, plural modules may be configured by a single program, and in an opposite manner, a single module may be configured by plural programs. Furthermore, plural modules may be executed by a single computer or a single module may be executed by plural computers in a distributed or parallel environment. Other modules may be included in a single module.

In the following, the expression "connection" is also used in a case of a logical connection (sending and receiving of data, issuing of instructions, reference relationship between data, or the like) in addition to a physical connection.

The expression "predetermined" is used to include the meaning that matters are determined before processing regarded as a target is performed, and matters are determined based on the situation and the state at that time or determined based on the situation and the state until that time before the processing regarded as the target is performed even after the processing in the exemplary embodiment is started as well as before the processing in the exemplary embodiment is started. In a case where there are plural "predetermined values", the predetermined values may be respectively different values or two or more (also including all the values) of the predetermined values may be the same. The description signifying that "In a case of A, it is regarded as B" is used to signify that "It is determined whether it is A, and when it is determined that it is A, it is regarded as B". However, a case where the determination as to whether it is A is unnecessary is excluded.

A system or an apparatus is configured in such a way that plural computers, hardware, apparatuses or the like are connected to each other by a communication unit such as a network (including communication connection on one-to-one correspondence), and may be implemented by a single computer, hardware, apparatus or the like. The "apparatus" and the "system" are interchangeably used herein as having the same meaning. The "system" does not include a social "mechanism" (a social system) that is merely an artificial arrangement.

A piece of information regarded as a target is read from the storage device for each processing by each module or for each processing in a case where plural processing is performed in the module and a processing result is written into the storage device after the processing is performed. Accordingly, description of the reading from the storage device before the processing and the writing into the storage device after the processing may be omitted. Here, the storage device may include a hard disk, a random access memory (RAM), an external storage medium, a storage device through a communication line, a register within a central processing unit (CPU) or the like.

An information processing apparatus 100 according to the first exemplary embodiment is for controlling movement of a document having a risk of leakage of a piece of personal information, and as illustrated in the example of FIG. 1, includes a personal information retaining level definition module 105, a user definition module 110, a document storage module 115, a document scan module 120, a personal information score calculation module 125, a document personal information score retaining module 130, a document move monitoring module 135, a control module 140, a log recording module 145, and an alert notifying module 150.

The document storage module 115 is connected with the personal information retaining level definition module 105, the document scan module 120, and the document move monitoring module 135. The document storage module 115 stores a document (file). Specifically, the document storage module 115 corresponds to local disks of a file server, a document management device system, a personal computer (PC) or the like.

The document scan module 120 is connected with the document storage module 115, the personal information score calculation module 125, and the document personal information score retaining module 130. The document scan module 120 transfers the document to the personal information score calculation module 125. The document scan module 120 applies the personal information score calculation module 125 to all of the documents in an area (specifically, a directory, a folder or the like which is, hereinafter, also referred to as a directory), that is a storing place for all or designated documents of the document storage module 115, regularly and stores the result in the document personal information score retaining module 130.

The personal information score calculation module 125 is connected with the document scan module 120. The personal information score calculation module 125 transfers the score to the document scan module 120. The personal information score calculation module 125 calculates personal information scores of respective documents. The personal information score calculation module 125 extracts portions which might include personal information (for example, My-Number or Security and Tax Number) by, for example, a pattern matching technique, gives a score to the extracted portion, and furthermore, returns a total of the scores to the document scan module 120. Here, the My-Number is assigned to each citizen in Japan based on "Act on the Use of Numbers to Identify a Specific Individual in the Administrative Procedure" and is a 12-digit number.

The document personal information score retaining module 130 is connected with the document scan module 120 and the document move monitoring module 135. The document personal information score retaining module 130 stores the document in correlation with a score indicating how much the document includes pieces of personal information. That is, the document personal information score retaining module 130 holds a personal information score for each document. The document personal information score retaining module 130 manages a document name, a document hash, a total score, score details, a directory, or the like. For example, the document personal information score retaining module 130 stores a document and personal information score pair table 500. FIG. 5 is an explanatory diagram illustrating an example of a data structure of the document and personal information score pair table 500. The document and personal information score pair table 500 includes a document name column 510, a document hash column 520, a total score column 530, a score details column 540, and a saving place column 550. The document name column 510 stores a document name. The document hash column 520 stores a hash value for the document. It may be determined whether a document which is set as a movement target is stored in the document and personal information score pair table 500 or not (whether a personal information score is calculated or not) using the hash value. The total score column 530 stores a total score which is a computation result related to the document and obtained from the personal information score calculation module 125. The score details column 540 stores details of the score. Specifically, the details include a position in the document in which the piece of personal information is written and the score of the personal information. The saving place column 550 stores a saving place (directory) of the document.

The personal information retaining level definition module 105 is connected with the document storage module 115 and the document move monitoring module 135. The personal information retaining level definition module 105 defines a personal information retaining level for each document of the document storage module 115 or each area which is a storing place of the document. For example, personal information retaining level is defined by a personal information retaining level definition table 600. FIG. 6 is an explanatory diagram illustrating an example of a data structure of the personal information retaining level definition table 600. The personal information retaining level definition table 600 includes a directory column 610, a name column 620, a personal information group column 630, a personal information level column 640, and a My-Number level column 650. In the personal information retaining level definition table 600, a directory containing the piece of personal information is defined. The directory column 610 stores a pointer to the directory. The name column 620 stores the directory name. The personal information group column 630 stores the name of the piece (for example, a user for X service, mail magazine members or the like) of personal information handled by the user. The personal information level column 640 stores an importance degree of personal information. The My-Number level column 650 stores a My-Number level, specifically, a piece of information indicating whether the My-Number is included (1) or not (0). For example, the personal information level or the My-Number level is exemplified as the "importance degree of personal information".

The user definition module 110 is connected with the document move monitoring module 135. The user definition module 110 defines the importance degree of the piece of personal information capable of being handled by the user for each user (may include a group containing plural users). For example, the importance degree of the piece of personal information is defined by the user definition table 700. FIG. 7 is an explanatory diagram illustrating an example of a data structure of the user definition table 700. The user definition table 700 includes a user ID column 710, a personal information group column 720, a personal information level column 730, and a My-Number level column 740. The user definition table 700 gives the following pieces of information to each user. The pieces of information are defined for each personal information group. Accordingly, plural user definition tables 700 may exist for a single user. The user ID column 710 stores the piece of information for uniquely identifying the user (user identification (ID)) in the exemplary embodiment. The personal information group column 720 stores the name of the piece of personal information handled by the user (for example, user for X service, mail magazine members or the like). The personal information level column 730 stores the importance degree of the piece of the personal information capable of being handled by the user. The My-Number level column 740 stores the My-Number level of the user, specifically, a piece of information indicating whether the user is able to handle the My-Number (1) or not (0).

A relationship between the personal information level and the personal information score (score calculated by personal information score calculation module 125) in the personal information level column 640 of the personal information retaining level definition table 600 and the personal information level column 730 of the user definition table 700 is defined by the personal information level table 800. The personal information level table 800 may be stored either in the personal information retaining level definition module 105 or in the user definition module 110.

FIG. 8 is an explanatory diagram illustrating an example of a data structure of a personal information level table 800. The personal information level table 800 stores the personal information level column 810 and the personal information score column 820 in correlation with each other. Specifically, the first row of the personal information level table 800 means that in a case where the personal information score is "100" or more, the personal information level is "3" and "plural credit card numbers, account numbers, pieces of religion or health information or the like are included".

The second row of the personal information level table 800 means that in a case where the personal information level is "10" or more, and less than "100", the personal information level is "2" and "any one of the credit card number, the account number, the piece of religion or health information or the like is included".

The third row of the personal information level table 800 means that in a case where the personal information level is "0" or more, and less than "10", the personal information level is "1" and "A mailing address, a name and address or the like is included".

A relationship between the My-Number level and the personal information score (score calculated by personal information score calculation module 125) in the My-Number level column 650 of the personal information retaining level definition table 600 and the My-Number level column 740 of the user definition table 700 is defined by a My-Number level table 900. The My-Number level table 900 may be stored either in the personal information retaining level definition module 105 or in the user definition module 110.

FIG. 9 is an explanatory diagram illustrating an example of a data structure of the My-Number level table 900. The My-Number level table 900 stores a My-Number level column 910 and a My-Number score column 920 in correlation with each other. Specifically, the first row of the My-Number level table 900 means that in a case where the My-Number score is "10" or more, the My-Number level is "1" and a "possibility of including the My-Number is 10% or more".

The second row of the My-Number level table 900 means that in a case where the My-Number score is "0" or more, and less than "10", the My-Number level is "0" and a "possibility of including the My-Number is less than 10%".

The document move monitoring module 135 is connected with the personal information retaining level definition module 105, the user definition module 110, the document storage module 115, the document personal information score retaining module 130, the control module 140, the log recording module 145, and the alert notifying module 150. The document move monitoring module 135 monitors the document storage module 115, refers to the personal information retaining level definition module 105, the user definition module 110, and the document personal information score retaining module 130, and starts the control module 140, the log recording module 145, and the alert notifying module 150.

The document move monitoring module 135 monitors movement of a document. A score indicating how much a document includes pieces of personal information is correlated with each document by the document personal information score retaining module 130. The movement includes copying, downloading or the like.

The control module 140 is connected with the document move monitoring module 135. In a case where the score is larger than a predetermined threshold value or greater than or equal to the predetermined threshold value, when a relationship among an importance degree of personal information of a movement source, an importance degree of personal information of a movement destination, and a score of the document which is a movement target corresponds to a predetermined relationship, the control module 140 controls the movement. Here, the movement source refers to an area of the storing place of a document, which is the movement target, before the movement of the document.

The movement destination refers to an area of the storing place of a document, which is the movement target, after the movement of the document.

The predetermined relationship may include the following relationships. The relationships are defined by the determination condition table 1200 or the determination condition table 1400 which will be described later.

In a case where the importance degree of the personal information of the movement destination is less than the importance degree of the personal information of the movement source, when the score of the document is higher than a predetermined first threshold value or greater than or equal to the predetermined first threshold value, the control module 140 may prohibit the movement.

In a case where the importance degree of the personal information of the movement destination is less than the importance degree of the personal information of the movement source, when the score of the document is within a predetermined range, the control module 140 may issue a warning when the document is moved.

In a case where the importance degree of the personal information of the movement destination is less than the importance degree of the personal information of the movement source, when the score of the document is less than a predetermined second threshold value or equal to or less than the second threshold value, the control module 140 may permit the movement.

A value indicating a possibility of including the personal number may be used as the importance degree of the personal information. Here, the personal number corresponds to the My-Number.

The log recording module 145 is connected with the document move monitoring module 135 and the control module 140. In a case where the movement is determined as a "prohibition" or a "warning" by the control module 140, the log recording module 145 stores a operation history of the movement of the document. For example, a log table 1300 is used for storing the history of operations for the movement of the document. FIG. 13 is an explanatory diagram illustrating an example of the log table 1300. The log table 1300 includes a log ID column 1310, a date and time column 1320, a document name column 1330, a result code column 1340, a copy source column 1350, a copy destination column 1360, and a user ID column 1370. The log ID column 1310 stores a piece of information (log ID) for uniquely identifying the log in the exemplary embodiment. The date and time column 1320 stores a date and time at which the operation occurs. The document name column 1330 stores a name of the document which is a target to be operated. The result code column 1340 stores a result code. Specifically, the result code is a piece of information indicating a "prohibition" or a "warning" which is a determination result of the control module 140. The copy source column 1350 stores a directory of a movement source of a document which is a target to be operated. The copy destination column 1360 stores a directory of a movement destination of a document which is a target to be operated. The user ID column 1370 stores a user ID of the user who performs the operation.

The alert notifying module 150 is connected with the document move monitoring module 135 and the control module 140. In a case where it is determined as a "warning" by the control module 140, the alert notifying module 150 may output the warning either to the user who performs the operation or a manager. The warning may be presented by outputting voice to a voice output device such as a speaker, vibration, or the like or a combination thereof in addition to displaying of the warning on a display such as a liquid crystal device. Here, the notification for the warning may include, for example, a notification using e-mail, chatting, an electronic bulletin board, social media, a push notification or the like.

Figure 2A:
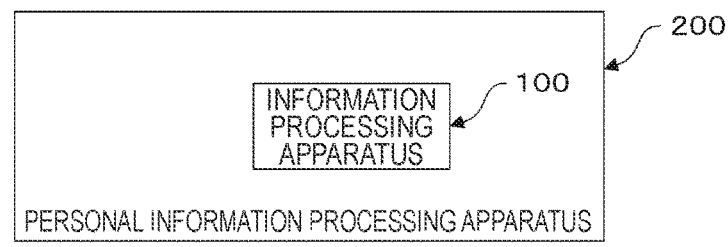
FIG. 2A and FIG. 2B are explanatory diagrams illustrating a configuration example of a system using the exemplary embodiment.
Figure 2B:
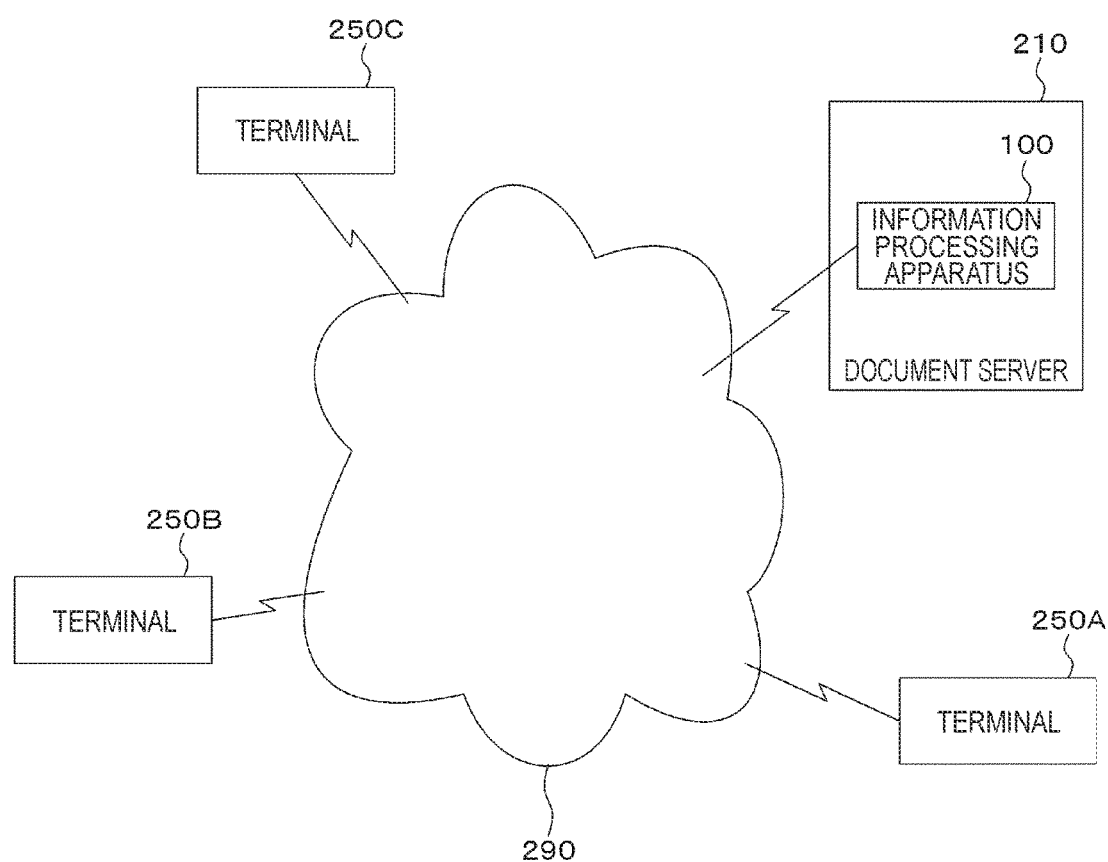

FIG. 2A and FIG. 2B are explanatory diagrams illustrating a configuration example of a system using the exemplary embodiment.

As illustrated in the example of FIG. 2A, the information processing apparatus 100 may be included in the personal information processing apparatus 200 such as a PC. The document move monitoring module 135 of the information processing apparatus 100 becomes able to monitor the operation of the personal information processing apparatus 200 by the user.

As illustrated in the example of FIG. 2B, the information processing apparatus 100 may be included in the document server 210 serving as the document management device system. The information processing apparatus 100 of the document server 210, a terminal 250A, a terminal 250B, and a terminal 250C are connected to each other through the communication line 290. The communication line 290 may be a wired communication network, a wireless communication network, or a combination of the wired communication network and the wireless communication network, and may be, for example, the Internet and the Ethernet as a communication infrastructure. The function by the document server 210 may be implemented as a cloud service. In this example, the document move monitoring module 135 of the information processing apparatus 100 becomes able to monitor the operation of each terminal 250 by the user with respect to the document storage module 115 of the information processing apparatus 100.

Figure 3:
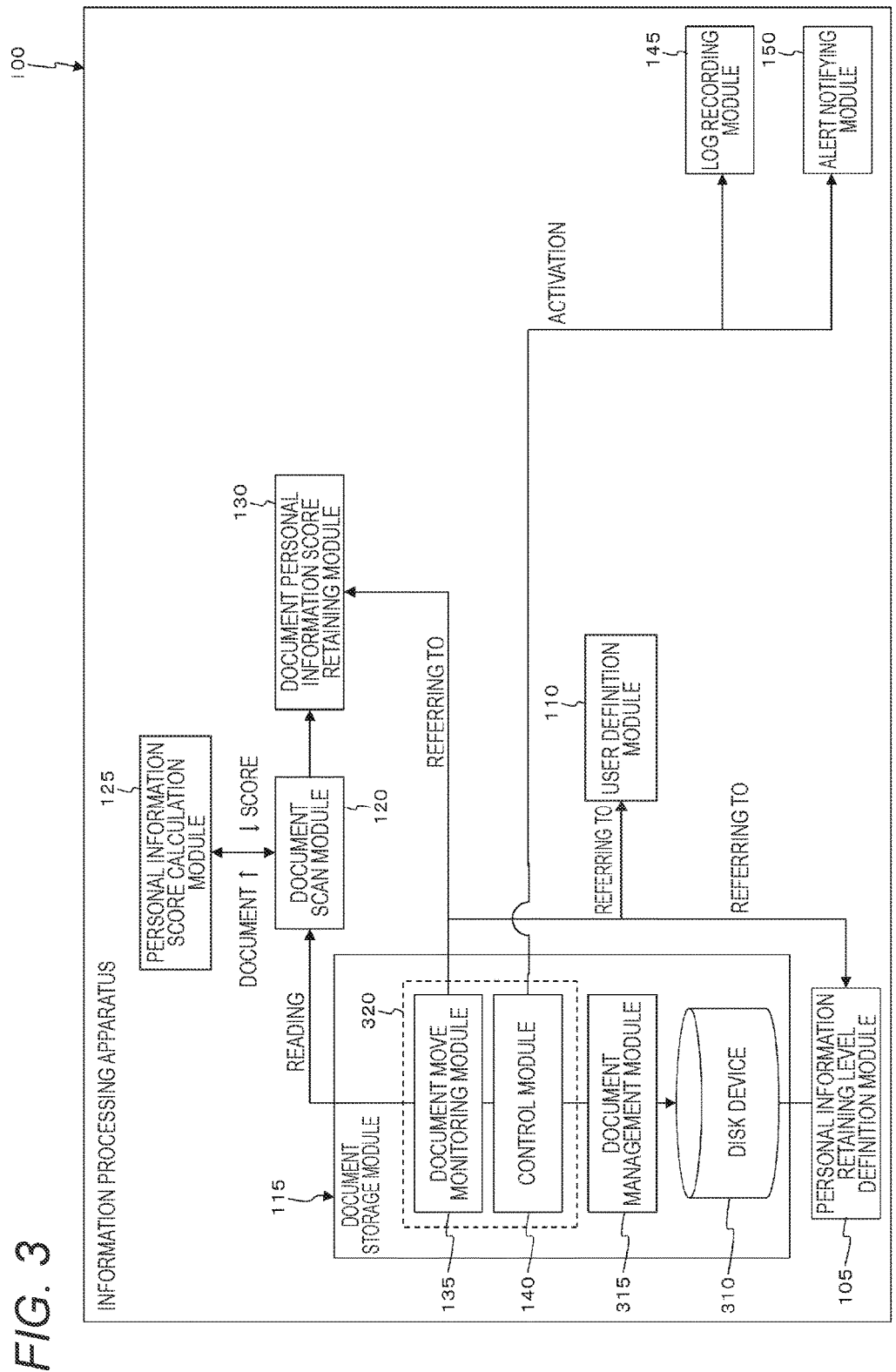
FIG. 3 is a configuration diagram conceptually illustrating modules in another configuration example of the first exemplary embodiment.

FIG. 3 is a configuration diagram conceptually illustrating modules in a configuration example of the first exemplary embodiment.

The information processing apparatus 100 includes the personal information retaining level definition module 105, the user definition module 110, the document storage module 115, the document scan module 120, the personal information score calculation module 125, the document personal information score retaining module 130, the log recording module 145, and the alert notifying module 150.

The document storage module 115 includes a disk device 310, a document management module 315, and a monitoring module 320 and is connected with the personal information retaining level definition module 105 and the document scan module 120. The document storage module 115 is configured with the document management module 315 responsible for actual movement processing, the disk device 310 storing the substance of a document, and the monitoring module 320.

The disk device 310 stores the substance of the document.

The document management module 315 performs processing for the document stored in the disk device 310. The processing includes movement (including copy, download which is copying from and to the outside (the above-mentioned terminal 250 or the like), storing of a new document or the like), attribute change, retrieval or the like.

The monitoring module 320 includes the document move monitoring module 135 and the control module 140. That is, in this example, the document move monitoring module 135 and the control module 140 are adapted to reside in the document storage module 115. The document move monitoring module 135 resides to function as a hook of the document management module 315 and becomes able to intercept a request for processing.

FIG. 4 is a flowchart illustrating an example of a process performed by the first exemplary embodiment (document scan module 120). The document scan module 120 reads a document from the document storage module 115 and stores a result calculated by the personal information score calculation module 125 in the document personal information score retaining module 130.

In Step S402, a single document is taken out from the document storage module 115.

In Step S404, it is determined whether a computation of a personal information score for the document is completed or not.

In a case where the computation is completed, the process proceeds to Step S410, and otherwise, the process proceeds to Step S406.

In Step S406, the document is transferred to the personal information score calculation module 125 and a score is obtained. In Step S406, the personal information score calculation module 125 calculates a personal information score indicating how much the document includes pieces of personal information, using a conventional method.

For example, the calculation may be performed as follows.

When a 12-digit number is able to be extracted as a pattern of the My-Number, it is determined that a possibility of including the My-Number is 10% or more.

A personal name, an address or the like may be extracted using, for example, a personal name dictionary, a place name dictionary or the like, and a pattern of a place name "(zip code) (prefecture) cities, towns, and villages town name number" may be extracted. Alphanumeric character strings including "@" (or, "at" which is the replacement "@" or a multibyte character of "@" and the like) which is a pattern of e-mail may be extracted. When the personal name, an address or the like and the pattern of e-mail are able to be extracted, a predetermined personal information score may be given.

The personal information score is raised by a degree of adjacency between the personal name, the address or the like and e-mail (addition of a predetermined score, multiplication of a predetermined value (1 or more), or the like).

When the piece of information formed in a table format is recognized and the "name" or the like is written in an item name (for example, first row, or first column) of the table, the personal information score may be raised.

In Step S408, a pair of the document and the score is stored in the document personal information score retaining module 130. For example, the pair of the document and the score is stored in the document and personal information score pair table 500.

In Step S410, it is determined whether a next document exists or not. When it is determined that the next document exists, the process proceeds to Step S412, and otherwise, the process is ended (Step S499).

In Step S412, the next document is taken out and the process returns to Step S404.

Figure 10:
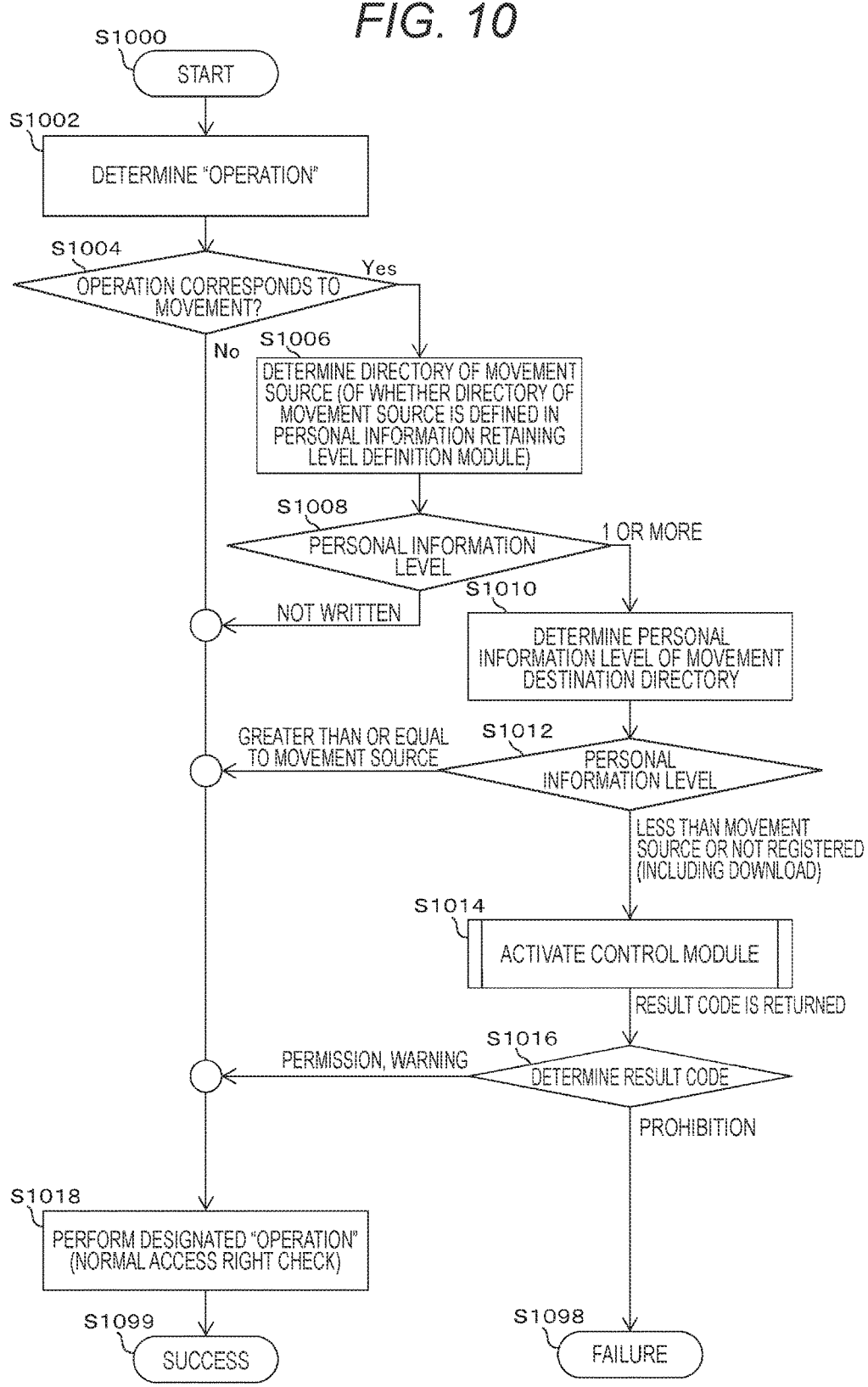
FIG. 10 is a flowchart illustrating an example of another process performed by the first exemplary embodiment.

FIG. 10 is a flowchart illustrating an example of a process performed by the first exemplary embodiment (document move monitoring module 135 and the control module 140).

In Step S1002, an "operation" to a document within the disk device 310 is determined.

In Step S1004, it is determined whether the operation corresponds to the movement.

In a case where the operation is the movement, the process proceeds to Step S1006 and otherwise, the process proceeds to Step S1018. As described above, the movement includes copying or the like.

In Step S1006, a determination on the directory of the movement source (of whether the directory of the movement source is defined in the personal information retaining level definition module 105) is performed.

In Step S1008, the personal information level is determined.

In a case where the personal information level is "1 or more", the process proceeds to Step S1010 and otherwise, in a case of "not written", the process proceeds to Step S1018.

In Step S1010, a determination on the personal information level of the directory of the movement destination is performed.

In Step S1012, the personal information level of the movement source directory is compared with the personal information level of the directory of the movement destination and in a case where the comparison result is "less than the personal information level of the movement source or not registered (including download)", the process proceeds to Step S1014, and otherwise, in a case where the comparison result is "greater than or equal to the personal information level", the process proceeds to Step S1018.

In Step S1014, the processing by the control module 140 is performed. Details of the processing will be described later using a flowchart illustrated in an example of FIG. 11.

In Step S1016, a result code obtained by the processing in Step S1014 is determined, and in a case where the result code corresponds to "permission or warning", the process proceeds to Step S1018, and otherwise, in a case of "prohibition", a "failure" is set (In Step S1098).

In Step S1018, a designated "operation" is performed. However, a normal access right check is performed.

In Step S1099, a "success" is set.

FIG. 11 is a flowchart illustrating an example of a process performed by the first exemplary embodiment (control module 140).

The control module 140 receives a document, a target record of the document and the personal information score pair table 500 within the document personal information score retaining module 130 for the document, and the personal information level of the movement source, the personal information level of the movement destination, and a user ID of an operator from the document move monitoring module 135.

In Step S1102, the personal information level is determined using the personal information level of a copy destination (in a case of being undefined, the personal information level is 0) and the document personal information score or the like. Specifically, the determination is performed using a determination condition table 1200. FIG. 12 is an explanatory diagram illustrating an example of a data structure of the determination condition table 1200.

The determination condition table 1200 includes a copy source personal information level column 1210, a copy destination personal information level column 1220, a personal information score column 1230, and a response column 1240. The copy source personal information level column 1210 stores the personal information level of the copy source. The copy destination personal information level column 1220 stores the personal information level of the copy destination. The personal information score column 1230 stores the document score. The response column 1240 stores a response operation. That is, in a case where the conditions of the copy source personal information level column 1210, the copy destination personal information level column 1220, and the personal information score column 1230 are satisfied, a code stored in the response column 1240 is adopted. Here, the first row of the determination condition table 1200 indicates an example of "in a case where the importance degree of the personal information of the movement destination is less than the importance degree of the personal information of the movement source, when the score of the document is higher than a predetermined first threshold value or greater than or equal to the predetermined first threshold value (in this example, 100), the movement is prohibited". The second row of the determination condition table 1200 indicates an example of "in a case where the importance degree of the personal information of the movement destination is less than the importance degree of the personal information of the movement source, when the score of the document is within a predetermined range (in this example, a range from 10 to 100), a warning is issued when the document is moved". The third row of the determination condition table 1200 indicates an example of "in a case where the importance degree of the personal information of the movement destination is less than the importance degree of the personal information of the movement source, when the score of the document is less than a predetermined second threshold value (in this example, 10) or equal to or less than the second threshold value, the movement is permitted".

Although the example in which "3" is set as the content of the copy source personal information level column 1210 and "2" is set as the copy destination personal information level column 1220 is illustrated, other patterns may also be stored in the determination condition table 1200.

In Step S1104, a confirmation of a determination result is performed. As described above, for example, in a case where the importance degree of the personal information of the movement destination is less than the importance degree of the personal information of the movement source, when the score of the document is higher than a predetermined first threshold value or greater than or equal to the predetermined first threshold value (in this example, 100), the process proceeds to Step S1106. For example, in a case where the importance degree of the personal information of the movement destination is less than the importance degree of the personal information of the movement source, when the score of the document is within a predetermined range (in this example, a range from a second threshold value (10) to a first threshold value (100)), the result code is the "warning" and thus, the process proceeds to Step S1108. In a case where the importance degree of the personal information of the movement destination is less than the importance degree of the personal information of the movement source, when the score of the document is less than a predetermined second threshold value (in this example, 10) or equal to or less than the second threshold value, the process proceeds to Step S1110.

In Step S1106, the result code is set as the "prohibition" (corresponds to a case of the first row of the determination condition table 1200), and the process proceeds to Step S1112.

In Step S1108, the result code is set as the "warning" (a case of the second row of the determination condition table 1200), and the process proceeds to Step S1112.

In Step S1110, the result code is set as the "permission" (a case of the third row of the determination condition table 1200), and the process is ended (In Step S1199).

In Step S1112, the log is written. The example of FIG. 13 described above is stored in the log table 1300.

In Step S1114, the log is delivered to a manager. Specifically, the log table 1300 is displayed to the manager.

Regarding the My-Number level, similar processing as that of the personal information level may be performed and a determination condition table 1400 in which similar conditions as those of the determination condition table 1200 are defined may be used. FIG. 14 is an explanatory diagram illustrating an example of a data structure of the determination condition table 1400. The determination condition table 1400 includes a copy source My-Number level column 1410, a copy destination My-Number level column 1420, a My-Number score column 1430, and a response column 1440. The copy source My-Number level column 1410 stores the My-Number level of the copy source. The copy destination My-Number level column 1420 stores the My-Number level of the copy destination. The My-Number score column 1430 stores the My-Number score. The response column 1440 stores a response operation. That is, in a case where the conditions of the copy source My-Number level column 1410, the copy destination My-Number level column 1420, and the My-Number score column 1430 are satisfied, a code stored in the response column 1440 is adopted. Here, the first row of the determination condition table 1400 indicates an example of "in a case where the My-Number level (an example of the importance degree of the personal information a document score) of the movement destination is less than the My-Number level of the movement source, when the My-Number score (an example of a document score) is higher than a predetermined first threshold value or greater than or equal to the predetermined first threshold value (in this example, 10), the movement is prohibited". The second row of the determination condition table 1400 indicates an example of "in a case where the My-Number level of the movement destination is less than the My-Number level of the movement source, when the score of the document is within a predetermined range (in this example, a range from 0 to 10), a warning is issued when the document is moved".

Second Exemplary Embodiment

Figure 15:
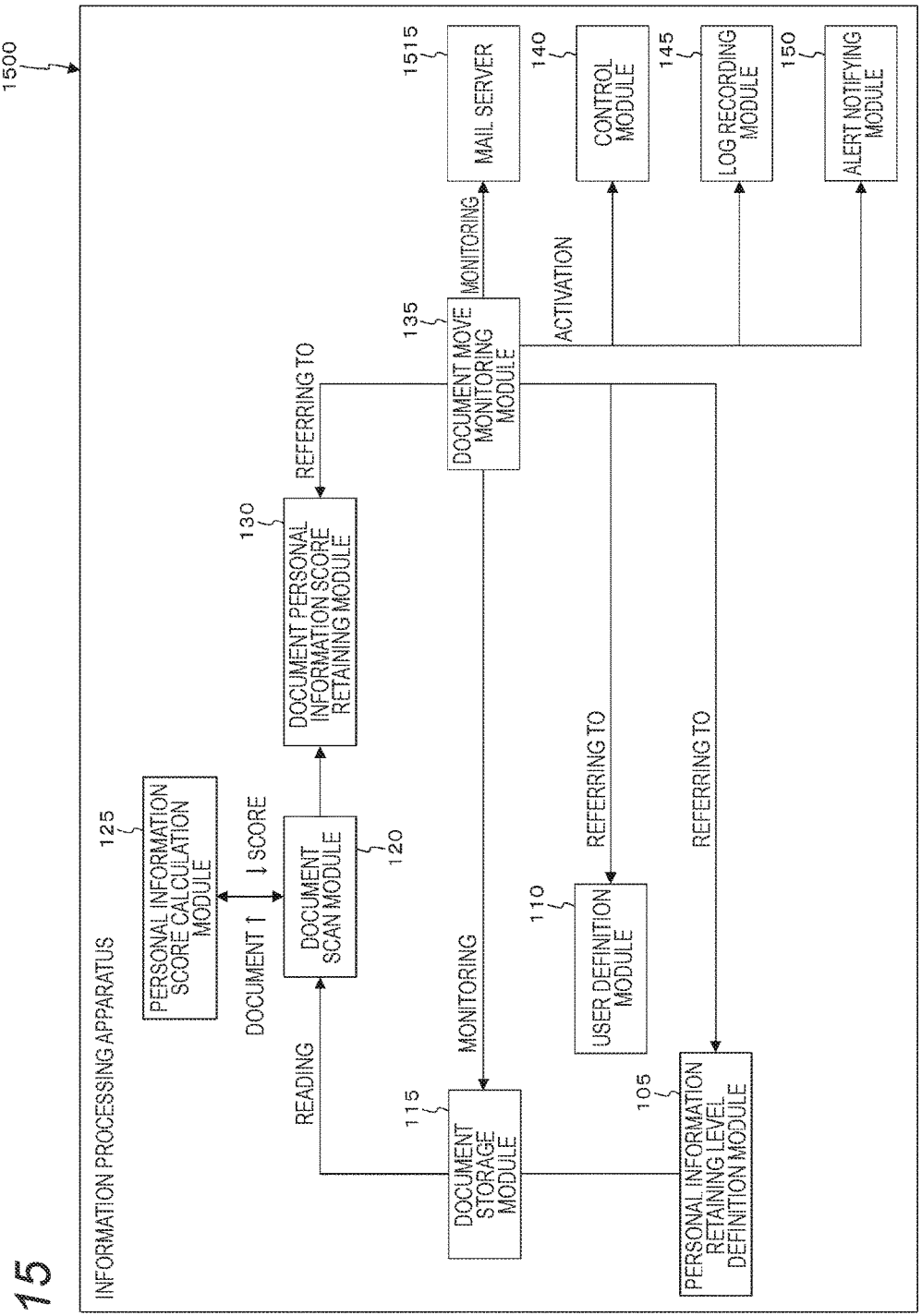
FIG. 15 is a configuration diagram conceptually illustrating modules in a configuration example of a second exemplary embodiment.

FIG. 15 is a configuration diagram conceptually illustrating modules in a configuration example of a second exemplary embodiment. In the second exemplary embodiment, the transmission by e-mail is included as the movement of document. Same types of constitutional parts as those of the first exemplary embodiment are denoted by same reference numerals and redundant descriptions thereof will not be repeated.

Although a configuration in which the information processing apparatus 1500 includes a mail server 1515 is described, in an opposite manner, another configuration in which the information processing apparatus 1500 (but, a module other than the mail server 1515) is included in the mail server 1515 may be adopted. For example, the document move monitoring module 135 and the control module 140 may reside within a communication module of the mail server 1515. The document move monitoring module 135 resides to function as a hook of e-mail transmission processing, intercepts a processing instruction, and sets the document to be transmitted by e-mail to a target to be transmitted when the result code is the document is either the permission or the warning.

In the processing of the information processing apparatus 1500, monitoring of the movement of document in the information processing apparatus 100 of the first exemplary embodiment corresponds to monitoring of the e-mail transmission in the mail server 1515.

The importance degree of the personal information capable of being handled by the email transmission destination (each person, group or the like) is used as the importance degree of the personal information of the movement destination. The user definition module 110 defines the importance degree of the personal information capable of being handled by the transmission destination.

The piece of information processing apparatus 1500 includes the personal information retaining level definition module 105, the user definition module 110, the document storage module 115, the document scan module 120, the personal information score calculation module 125, the document personal information score retaining module 130, the document move monitoring module 135, a mail server 1515, the control module 140, the log recording module 145, and the alert notifying module 150.

The document move monitoring module 135 is connected to the personal information retaining level definition module 105, the user definition module 110, the document storage module 115, the document personal information score retaining module 130, the control module 140, the log recording module 145, and the alert notifying module 150. The document move monitoring module 135 monitors the document storage module 115 and the mail server 1515, refers to the personal information retaining level definition module 105, the user definition module 110, and the document personal information score retaining module 130, and starts the control module 140, the log recording module 145, and the alert notifying module 150.

The mail server 1515 is connected with the document move monitoring module 135.

The control module 140 is connected with the document move monitoring module 135. The control module 140 performs the processing similar to that of the control module 140 in the first exemplary embodiment and controls e-mail transmission. The suppression causes a situation in which the mail is not transmitted, specifically, is temporarily placed in the mail server 1515. The temporary placing means that the mail is not deleted but stored in order for a manager or the like to check the mail.

Figure 16:
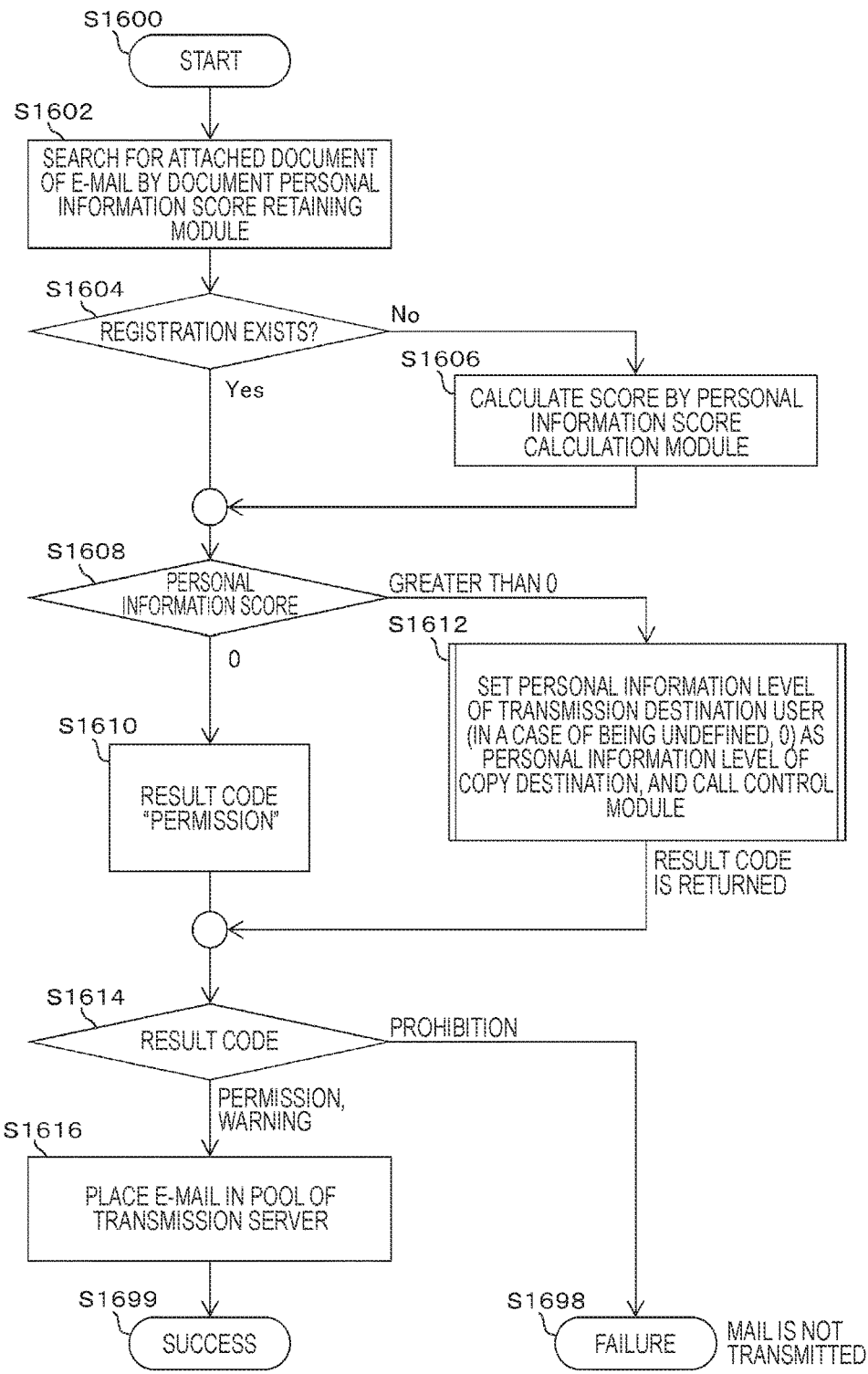
FIG. 16 is a flowchart illustrating an example of a process performed by the second exemplary embodiment.

FIG. 16 is a flowchart illustrating an example of a process performed by the second exemplary embodiment.

In Step S1602, an attached document of the e-mail is searched by the document personal information score retaining module 130.

In Step S1604, it is determined whether the registration exists.

In a case where the registration exists, the process proceeds to Step S1608 and otherwise, the process proceeds to Step S1606.

In Step S1606, the personal information score is calculated by the personal information score calculation module 125. That is, when the personal information score is not given to the document attached to e-mail, the personal information score of the document is calculated in real time.

In Step S1608, the personal information score is determined and in a case where the determination result is "0", the process proceeds to Step S1610 and otherwise, in a case of being "greater than 0", the process proceeds to Step S1612.

In Step S1610, the result code is set as the "permission".

In Step S1612, the personal information level of the transmission destination user is set as the personal information level of the copy destination (in a case of being undefined, the personal information level is 0), and calls the control module 140. The process is performed in line with the flowchart illustrated in the example of FIG. 11, and when the result code is returned, the process proceeds to Step S1614. In a case where a transmission destination of the document attached to e-mail is a user other than the user who has a level capable of handling the personal information defined in the user definition module 110, the control module 140 sets the result code as the prohibition or the warning.

In Step S1614, the result code is determined, and in a case where the result code is the "permission" or the "warning", the process proceeds to Step S1616 and otherwise, in a case of being the "prohibition", the result code is set as the "failure" (In Step S1698). In a case of being the "failure", the e-mail is not transmitted.

In Step S1616, the e-mail is placed in a pool maintained in a transmission server.

In Step S1699, a "success" is set.

Figure 17:
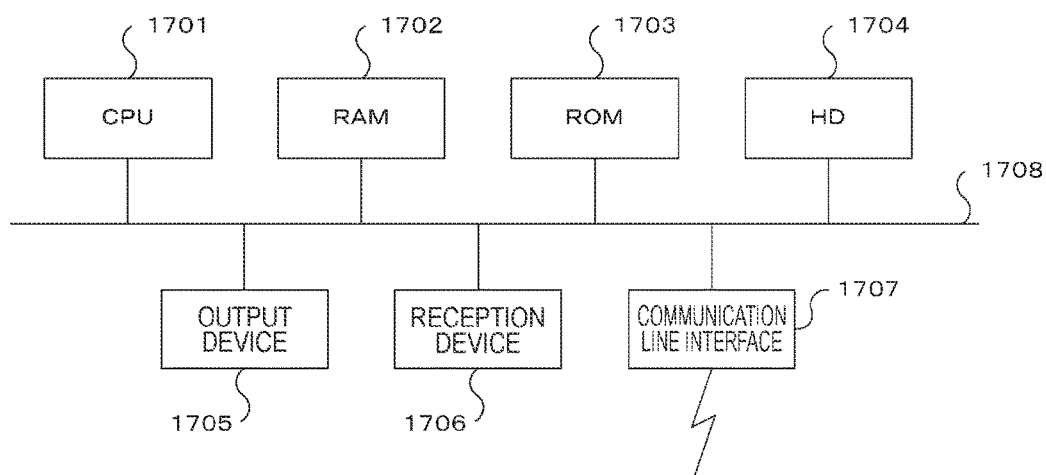
FIG. 17 is a block diagram illustrating an example of a hardware configuration of a computer that implements the exemplary embodiment.

A hardware configuration of a computer, which executes a program, as the exemplary embodiment is a general computer, specifically, a personal computer or a computer capable of becoming a server, as illustrated in FIG. 17. That is, as a specific example, a CPU 1701 is used as a processing unit (operation unit), a RAM 1702, a ROM 1703, and an HD 1704 are used as a storage device. For example, a hard disk or a solid state drive (SSD) may be used as the HD 1704. The computer is configured with the CPU 1701 that executes programs such as the document scan module 120, the personal information score calculation module 125, the document move monitoring module 135, the control module 140, the log recording module 145, and the alert notifying module 150, the RAM 1702 in which the program or data is stored, the ROM 1703 in which a program used for starting the computer of the exemplary embodiment is stored, the HD 1704 which is an auxiliary storage device (which may be a flash memory or the like) having functions of the personal information retaining level definition module 105, the user definition module 110, the document storage module 115, and the document personal information score retaining module 130, a reception device 1706 that receives data based on the operation of a keyboard, a mouse, a touch screen, a microphone or the like by a user, an output device 1705 such as a CRT, a liquid crystal device, a speaker or the like, a communication line interface 1707 for connecting with a communication network interface card, and a bus 1708 for connecting the components described above and used for exchanging data between the components. Plural computers may be connected with each other through a network.

Regarding matters corresponding to the computer program of the exemplary embodiments described above, a computer program which is software is read into a system having a hardware configuration of the exemplary embodiment, and software resources and hardware resources are cooperated with each other to implement the exemplary embodiment described above.

The hardware configuration of the information processing apparatus illustrated in FIG. 17 illustrates just one configuration example, the exemplary embodiment is not limited to the configuration illustrated in FIG. 17, and may be a configuration in which the modules described in the exemplary embodiment are adapted to be executable. For example, some of the modules may be implemented by exclusive hardware (for example, an application specific integrated circuit (ASIC) or the like), some of the modules may be adapted to be connected by the communication line placed within an external system.

Furthermore, plural systems each of which is illustrated in FIG. 17 may be connected to each other by the communication line to be cooperated with each other. In particular, the system may be incorporated into a portable information communication device (including a mobile phone, a smart phone, a mobile device, a wearable computer or the like), home information appliances, a robot, a copy machine, a facsimile, a scanner, a printer, a multifunction machine (image processing apparatus equipped with functions of two or more of a scanner, a printer, a copy machine, a facsimile or the like), in addition to the personal computer.

In the compare processing of the description of the exemplary embodiment described above, the expressions "or more", "or less", "greater than", and "less than (smaller than)" may be respectively used as the expressions of "greater than", "less than (smaller than)", "or more", and "or less", as long as inconsistency in a combination of the expressions does not occur.

The program described above may be provided in a state of being stored in a recording medium or be provided by a communication unit. In this case, for example, the program described above may be considered as an invention of a "computer readable recording medium having a program recorded therein".

The "computer readable recording medium having a program recorded therein" refers to a recording medium used for installation, execution, distribution or the like of the program, having recorded a program therein, and is readable by a computer.

The recording medium may include, for example, a digital versatile disk (DVD) such as "DVD-R, DVD-RW, DVD-RAM, or the like" that are standards formulated by the DVD forum, "DVD+R, DVD+RW, or the like" that are standards formulated by the DVD+RW, a compact disk (CD) such as a CD-read only memory (CD-ROM), a CD-recordable (CD-R), a CD-rewritable (CD-RW) or the like, a Blu-ray (registered trademark) Disc, an magnetooptical disk (MO), a flexible disk (FD), a magnetic tape, a hard disk, a read-only memory (ROM), an electrically erasable programmable read-only memory (EEPROM (registered trademark)), a flash memory, a random access memory (RAM), a secure digital (SD) memory card, or the like.

A portion or the entirety of the program may be recorded in the recording medium to be saved or distributed. The portion or the entirety of the program may be transmitted, by communication, using a transmission medium such as a wired communication network, a wireless communication network, and a combination of the wired communication network and the wireless communication network, that are used, for example, in a local area network (LAN), a metropolitan area network (MAN), a wide area network (WAN), the Internet, the Ethernet, and an extra network, or may be carried by being superposed on a carrier wave.

Furthermore, the program may be a portion or the entirety of another program or may be recorded in the recording medium together with a separate program. The program may be divided to be recorded in plural recording media. The program may be recorded in any format such as a compressed format, an encrypted format, or the like as long as the program is able to be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor programmed to:
        monitor movement of a document being correlated with a score indicating how much personal information is included in the document; and
        in a case where (i) the document is set as a target to be moved from a movement source to a movement destination and (ii) the document is correlated with the score that is greater than or equal to a predetermined threshold value:
            determine a relationship among (i) a first value representing an importance degree of personal information of the movement source, (ii) a second value representing an importance degree of personal information of the movement destination, and (iii) the score of the document; and
            when the relationship among the first value, the second value and the score of the document corresponds to a predetermined relationship, control the movement of the document; and
        prohibit the movement of the document in a case where:
            (i) the second value representing the importance degree of the personal information of the movement destination is less than the first value representing the importance degree of the personal information of the movement source, and
            (ii) the score of the document is greater than or equal to a predetermined first threshold value.

2. The information processing apparatus according to claim 1, wherein the processor is programmed to
    issue a warning when the document is moved in a case where:
        (i) the second value representing the importance degree of the personal information of the movement destination is less than the first value representing the importance degree of the personal information of the movement source, and
        (ii) the score of the document is within a predetermined range.

3. The information processing apparatus according to claim 1, wherein the processor is programmed to
    permit the movement of the document in a case where:
        (i) the second value representing the importance degree of the personal information of the movement destination is less than the first value representing the importance degree of the personal information of the movement source, and
        (ii) the score of the document is less than or equal to a predetermined second threshold value.

4. The information processing apparatus according to claim 1, wherein a value indicating a possibility of including a personal number is used as the importance degree of the personal information.

5. The information processing apparatus according to claim 1, wherein:
    the movement of the document includes transmission by e-mail, and
    the importance degree of the personal information capable of being handled by an e-mail transmission destination is used as the importance degree of the personal information of the movement destination.

6. A non-transitory computer readable medium storing a program causing a computer to perform:

monitoring movement of a document being correlated a score indicating how much personal information is included in the document; and in a case where (i) the document is set as a target to be moved from a movement source to a movement destination and (ii) the document is correlated with the score that is greater than or equal to a predetermined threshold value:

determining a relationship among (i) a first value representing an importance degree of personal information of the movement source, (ii) a second value representing an importance degree of personal information of the movement destination, and (iii) the score of the document; and when the relationship among the first value, the second value and the score of the document corresponds to a predetermined relationship, controlling the movement of the document; and prohibiting the movement of the document in a case where:

(i) the second value representing the importance degree of the personal information of the movement destination is less than the first value representing the importance degree of the personal information of the movement source, and (ii) the score of the document is greater than or equal to a predetermined first threshold value.

7. The information processing apparatus according to claim 1, wherein the processor is programmed to monitor the movement of an area of a storing place in which the document is stored to another area.

8. An information processing apparatus comprising:
a processor programmed to:

monitor movement of a document being correlated with a score indicating how much personal information is included in the document; and in a case where (i) the document is set as a target to be moved from a first storing place to a second storing place and (ii) the document is correlated with the score that is greater than or equal to a predetermined threshold value:

determine a relationship among (i) a first value representing an importance degree of personal information handled by a first user of the first storing place, (ii) a second value representing an importance degree of personal information handled by a second user of the second storing place, and (iii) the score of the document; and when the relationship among the first value, the second value and the score of the document corresponds to a predetermined relationship, control the movement of the document; and prohibiting the movement of the document in a case where:

(i) the second value representing the importance degree of the personal information of the movement destination is less than the first value representing the importance degree of the personal information of the movement source, and (ii) the score of the document is greater than or equal to a predetermined first threshold value.

* * * * *